(12) United States Patent
Howard et al.

(10) Patent No.: US 9,038,475 B2
(45) Date of Patent: *May 26, 2015

(54) DETECTION OF ANOMALOUS MOVEMENT IN A RECIPROCATING DEVICE

(75) Inventors: Brian F. Howard, Issaquah, WA (US);
Roger A. Hala, Gardnerville, NV (US);
L John Kitchens, Jr., Conroe, TX (US);
Stephen Edward Plaisance, Pasadena, TX (US)

(73) Assignee: General Electric Company, Schenectady, NY (US)

( * ) Notice: Subject to any disclaimer, the term of this patent is extended or adjusted under 35 U.S.C. 154(b) by 317 days.

This patent is subject to a terminal disclaimer.

(21) Appl. No.: 13/584,385

(22) Filed: Aug. 13, 2012

(65) Prior Publication Data
US 2012/0304775 A1 Dec. 6, 2012

Related U.S. Application Data

(63) Continuation of application No. 12/512,402, filed on Jul. 30, 2009, now Pat. No. 8,297,123.

(51) Int. Cl.
*G01N 29/00* (2006.01)
*G01N 29/04* (2006.01)
*G01H 11/00* (2006.01)

(52) U.S. Cl.
CPC ..................................... *G01H 11/00* (2013.01)

(58) Field of Classification Search
USPC ........... 73/570, 583–584, 659–660, 649–651, 73/114.07, 114.77; 702/33, 56, 74, 126, 702/189–190
See application file for complete search history.

(56) References Cited

U.S. PATENT DOCUMENTS

| 2,763,840 | A | 9/1956 | Pfleger |
| 3,393,557 | A | 7/1968 | Brown et al. |
| 3,400,578 | A | 9/1968 | Frarey et al. |
| 3,641,550 | A | 2/1972 | Lynas et al. |
| 3,742,395 | A | 6/1973 | Yoneyama |
| 3,758,758 | A | 9/1973 | Games et al. |
| 3,783,680 | A | 1/1974 | Mason |
| 4,157,457 | A | 6/1979 | Sakoe et al. |
| 4,408,285 | A | 10/1983 | Sisson et al. |
| 4,429,578 | A | 2/1984 | Darrel et al. |
| 4,475,401 | A | 10/1984 | Punia et al. |
| 4,480,480 | A | 11/1984 | Scott et al. |

(Continued)

OTHER PUBLICATIONS

Office Action Communication for U.S. Appl. No. 12/512,402 dated Dec. 23, 2011, 12 pages.

(Continued)

*Primary Examiner* — Helen Kwok
(74) *Attorney, Agent, or Firm* — Hiscock & Barclay LLP

(57) ABSTRACT

One embodiment of the invention provides a system for identifying an anomalous movement of a reciprocating element in a reciprocating device, the system comprising: at least one sensing device for sensing a vibration signal of the reciprocating element; a processing apparatus for separating the vibration signal into a first component having a first frequency range and a second component having a second frequency range different than the first frequency range; and a device for at least one of analyzing or displaying at least one of the first or the second components of the vibration signal, wherein the vibration signal includes positional data of the reciprocating element along at least one axis of the reciprocating element.

14 Claims, 6 Drawing Sheets

(56) References Cited

U.S. PATENT DOCUMENTS

| | | | |
|---|---|---|---|
| 4,483,179 | A | 11/1984 | Oshima et al. |
| 4,488,240 | A | 12/1984 | Kapadia et al. |
| 4,559,828 | A | 12/1985 | Liszka |
| 4,614,117 | A | 9/1986 | Taniguti |
| 4,908,785 | A | 3/1990 | Cubbins et al. |
| 4,980,844 | A | 12/1990 | Demjanenko et al. |
| 5,602,757 | A | 2/1997 | Haseley et al. |
| 5,610,339 | A | 3/1997 | Haseley et al. |
| 5,679,900 | A | 10/1997 | Smulders |
| 5,845,230 | A | 12/1998 | Lamberson |
| 6,026,348 | A | 2/2000 | Hala |
| 6,260,004 | B1 | 7/2001 | Hays et al. |
| 6,666,093 | B2 | 12/2003 | Morganti |
| 6,937,941 | B2 | 8/2005 | Hala et al. |
| 7,222,002 | B2 | 5/2007 | Maine |
| 7,299,680 | B2 | 11/2007 | Okubo et al. |
| 7,318,350 | B2 | 1/2008 | Boken |
| 7,334,568 | B2 | 2/2008 | Kobayashi et al. |
| 8,147,211 | B2 | 4/2012 | Grant et al. |
| 8,154,417 | B2 | 4/2012 | Hauenstein et al. |
| 8,297,123 | B2 * | 10/2012 | Howard et al. ............ 73/659 |

OTHER PUBLICATIONS

Office Action Communication for U.S. Appl. No. 12/512,402 dated Apr. 24, 2012, 11 pages.

Notice of Allowance and Fee(s) Due for U.S. Appl. No. 12/512,402 dated Jul. 26, 2012, 5 pages.

* cited by examiner

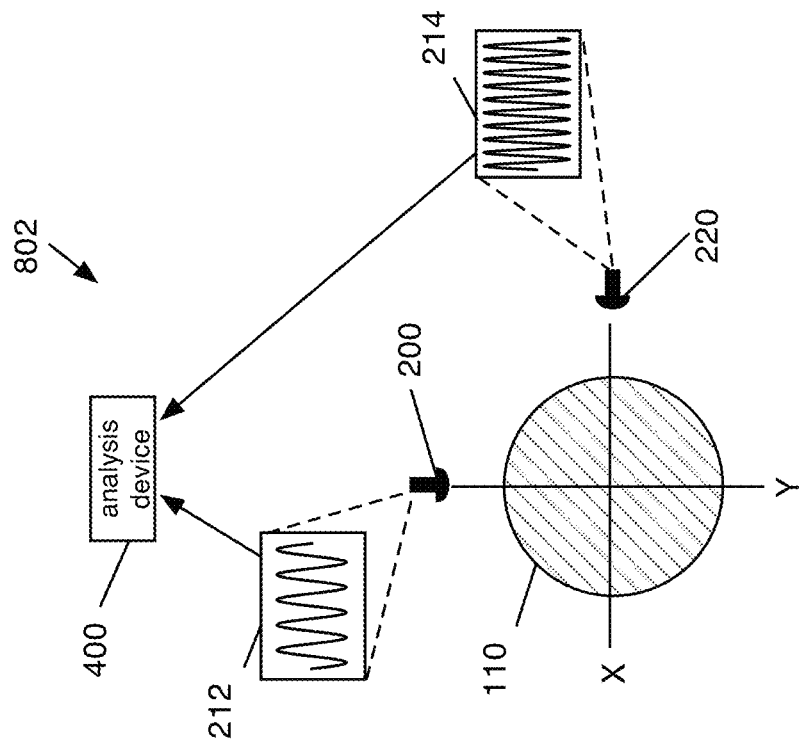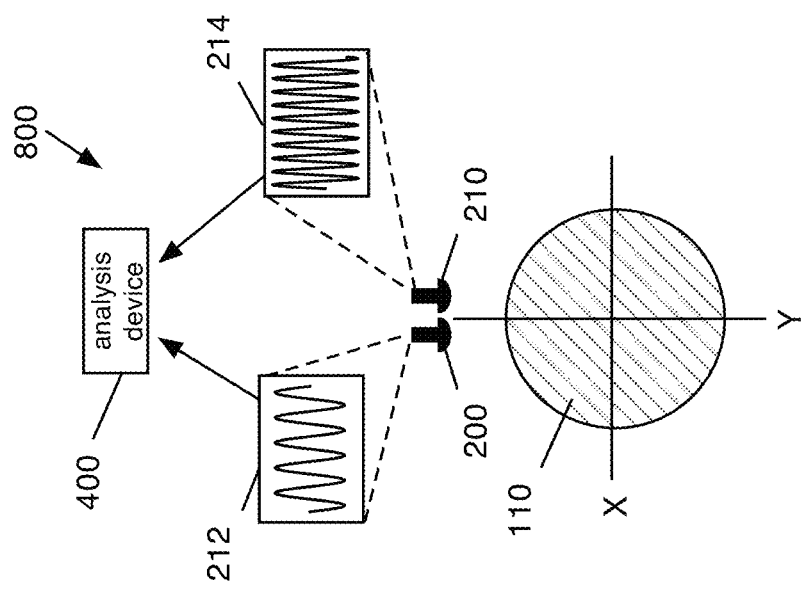

DETECTION OF ANOMALOUS MOVEMENT IN A RECIPROCATING DEVICE

CROSS-REFERENCE TO RELATED APPLICATIONS

This application is a Continuation of currently pending U.S. patent application Ser. No. 12/512,402 filed, Jul. 30, 2009, which is hereby incorporated herein as though fully set forth.

BACKGROUND OF THE INVENTION

Anomalous or aberrant movement of a reciprocating element in a reciprocating device poses a number of potential problems, ranging from decreased efficiency of the device to catastrophic failure of the device, with the potential for attendant harm to both people and property. While such anomalous or aberrant movement is known to produce vibratory signals, use of such signals to diagnose the cause, type, or extent of the anomalous or aberrant movement has, to date, been largely unsuccessful.

BRIEF DESCRIPTION OF THE INVENTION

One embodiment of the invention provides a system for identifying an anomalous movement of a reciprocating element in a reciprocating device, the system comprising: at least one sensing device for sensing a vibration signal of the reciprocating element; a processing apparatus for separating the vibration signal into a first component having a first frequency range and a second component having a second frequency range different than the first frequency range; and an analysis device for analyzing, displaying, or both, at least one of the first and the second components of the vibration signal.

Another embodiment of the invention provides a system for identifying an anomalous movement of a reciprocating element in a reciprocating device, the system comprising: a first sensing device for sensing a first component of a vibration signal of the reciprocating element, the first component having a first frequency range; a second sensing device for sensing a second component of the vibration signal of the reciprocating element, the second component having a second frequency range different than the first frequency range; and an analysis device for analyzing, displaying, or both, at least one of the first and the second components of the vibration signal.

Yet another embodiment of the invention provides a method of identifying an anomalous movement of a reciprocating element in a reciprocating device, the method comprising: sensing a vibration signal of the reciprocating element; separating the vibration signal into a first component having a first frequency range and a second component having a second frequency range different than the first frequency range; and analyzing, displaying, or both, at least one of the first and the second components of the vibration signal to identify an anomalous movement of the reciprocating element.

Still another embodiment of the invention provides a method of identifying an anomalous movement of a reciprocating element in a reciprocating device, the method comprising: sensing a first component of a vibration signal of the reciprocating element, the first component having a first frequency range; sensing a second component of the vibration signal of the reciprocating element, the second component having a second frequency range different than the first frequency range; and analyzing, displaying, or both, at least one of the first and the second components of the vibration signal to identify an anomalous movement of the reciprocating element.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 2-5 show cross-sectional views of reciprocating elements in conjunction with various components of systems according to embodiments of the invention;

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
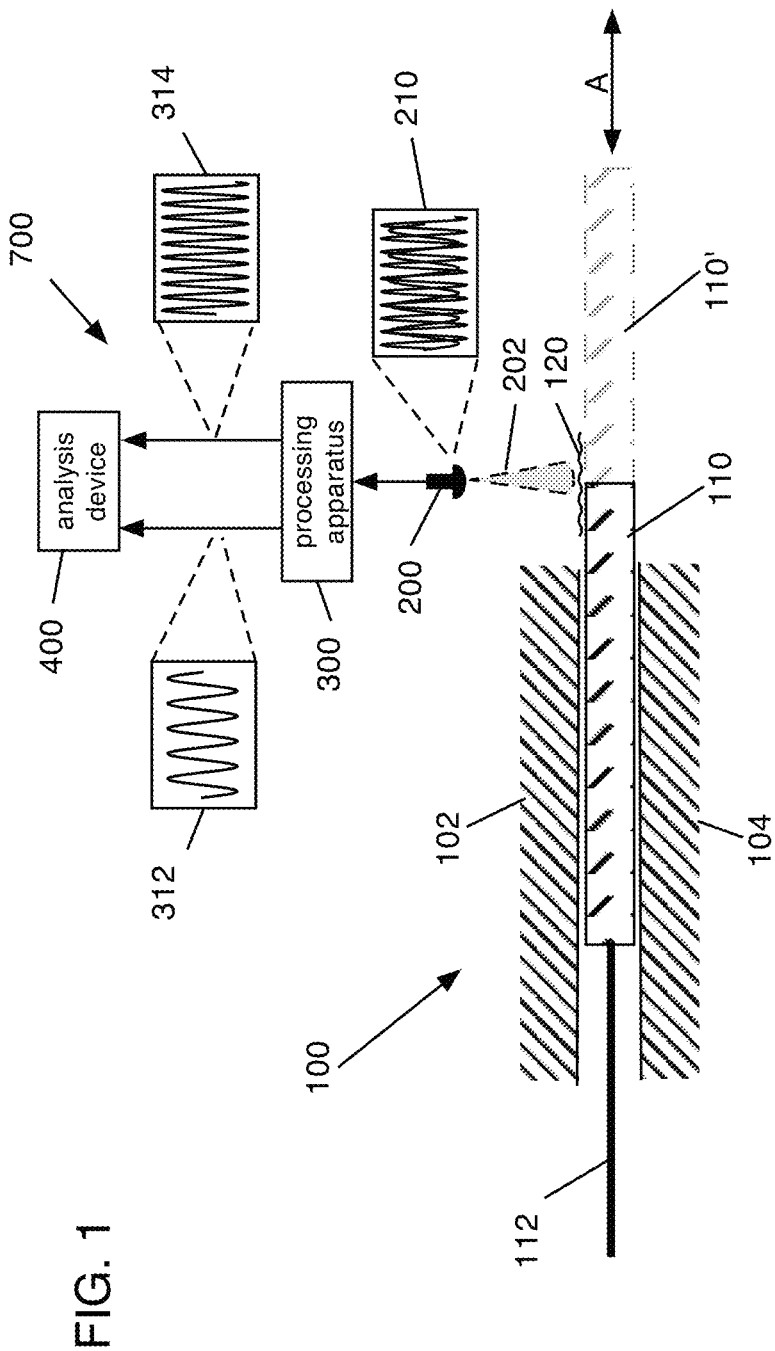
FIG. 1 shows a cross-sectional side view of a system according to one embodiment of the invention in conjunction with a reciprocating device.

FIG. 1 shows a cross-sectional side view of a reciprocating device 100 having a reciprocating element 110, non-reciprocating elements 102, 104, and a rod 112 or similar apparatus for moving the reciprocating element 110 along path A. The reciprocating device 100 may be any device having a reciprocating element. Such devices include, for example, engines, pumps, and compressors, although other devices having a reciprocating element will be known to one skilled in the art and are within the scope of devices subject to embodiments of the present invention.

As can be seen, the reciprocating element 110 assumes a distal position 110' when fully displaced along path A by the rod 112. It should be noted that while the non-reciprocating elements 102, 104 are shown and labeled as separate elements in the cross-sectional side view of FIG. 1, these may constitute a single non-reciprocating element through which the reciprocating element 110 passes.

In moving along path A, the reciprocating element 110 may produce a vibration signal 120. That is, anomalous or aberrant movement of the reciprocating element 110 may produce a measurable vibratory signal with respect to the non-reciprocating elements 102, 104 or some other non-reciprocating or fixed position. Often, such anomalous or aberrant movement occurs along one or more axes oriented substantially perpendicular to a longitudinal axis of the reciprocating element 110. As used herein, the terms "anomalous" and "aberrant" are meant to be interchangeable and to refer to movement of a reciprocating element to a degree, in a direction, or of a kind that results in suboptimal performance or efficiency of the device of which it is a part. In some cases, such movement is outside the intended operational parameters of the reciprocating element and which may result in decreased efficiency and/or damage to the reciprocating element, the reciprocating device of which it is a part, or any other device, apparatus, or system with which it is associated.

Still referring to FIG. 1, a system 700 according to one embodiment of the invention is shown, the system comprising a displacement sensor 200, a processing apparatus 300, and an analysis device 400. The displacement sensor 200 senses 202 the vibration signal 120 produced by the reciprocating element 110. In most, if not all cases, the vibration signal 120 will be a multi-frequency vibration signal 210. That is, the vibration signal 120 produced by the reciprocating element 110 contains a plurality of vibration signals, at least two of which have different frequencies.

The processing apparatus 300 splits the vibration signal 120 into a plurality of components 312, 314, at least two of which have different frequency ranges. For example, a first component 312 may include "low" frequency vibrations (e.g., those vibrations below a particular frequency) and a second component 314 may include "high" frequency vibrations (e.g., those vibrations above a particular frequency). It should be understood, however, that "low" and "high," as used in this example, are relative designations merely intended to distinguish the frequency ranges of the first component 312 and the second component 314. In other embodiments, the frequency ranges of the components may be defined as being between two specific frequencies. In still other embodiments, the processing apparatus 300 may split the vibration signal 120 into more than two components, each having a different frequency range. In some embodiments of the invention, the frequency ranges of each component do not overlap.

Similarly, it should be understood that less than the entire duration of the sensed vibration signal 120 may be delivered to the processing apparatus 300 (or, as will be described more fully below, subject to analysis using the analysis device 400). That is, the vibration signal 120 may be sensed 202 over a particular period while the first 312 and/or second component 314 processed and/or analyzed is representative of a briefer period. Likewise, the periods reflected by the first 312 and/or second component 314 may be representative of different periods.

The processing apparatus 300 may include any number of known or later-developed apparatuses, as will be recognized by one skilled in the art. Such apparatuses include, for example, high-pass filters, low-pass filters, and bandwidth filters. In some embodiments, the processing apparatus 300 may employ heuristic or non-deterministic methods (e.g., wavelets or neural networks) to separate a vibration signal by frequency. As used herein, the processing apparatus 300 may be any apparatus capable of splitting a vibration signal into components based on vibration frequency.

The analysis device 400 permits a user to separately analyze the first and second components 312, 314 of the vibration signal or performs such analysis itself. Accordingly, the analysis device 400 may include, for example, a printing device for producing a representation of one or more components (e.g., a printer, plotting device, etc.), an electronic display (e.g., an oscilloscope, computer monitor, etc.), or a computing device or plurality of computing devices having hardware, software, or both, for analyzing a vibration signal. Other devices useful in analyzing one or more components of the vibration signal will be known to one skilled in the art and are intended to be encompassed within the term "analysis device."

Figure 2:
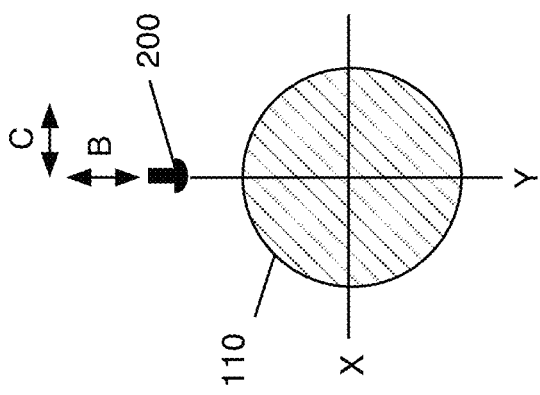
Figure 3:
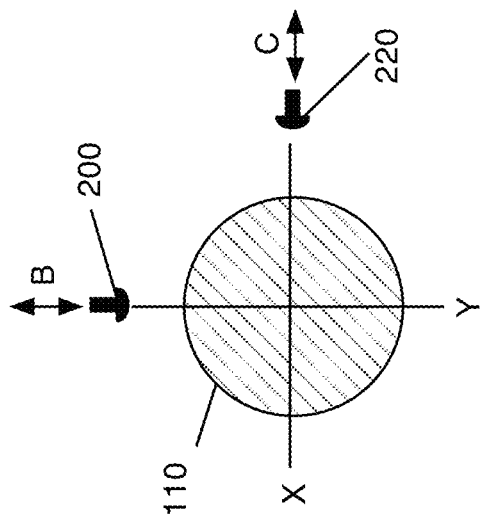

Referring now to FIGS. 2 and 3, a facing cross-sectional view of a reciprocating element 110 is shown. In the embodiment of FIG. 2, a displacement sensor 200 is oriented substantially along the Y-axis of the reciprocating element 110 and senses anomalous or aberrant movement of the reciprocating element 110 along both the Y-axis (i.e., along path B) and the X-axis (i.e., along path C).

In the embodiment of FIG. 3, two displacement sensors 200, 220 are employed, a first displacement sensor 200 being oriented substantially along the Y-axis of the reciprocating element 110 and a second displacement sensor 220 being oriented substantially along the X-axis of the reciprocating element 110. Here, the first displacement sensor 200 senses anomalous or aberrant movement of the reciprocating element 110 along the Y-axis (i.e., along path B) and the second displacement sensor 220 senses anomalous or aberrant movement of the reciprocating element 110 along the X-axis (i.e., along path C). In the embodiment of FIG. 3, each displacement sensor 200, 220 may sense a vibration signal that is then separated into two or more components.

Alternative embodiments of the invention are shown in FIGS. 4 and 5. In the embodiment of FIG. 4, a system 800 having a pair of displacement sensors 200, 210 is employed, each displacement sensor being oriented substantially along the Y-axis of the reciprocating element 110, but sensing separate components of the vibration signal. Here, a first displacement sensor 200 senses a first component 212 and a second displacement sensor 210 senses a second component 214, the second component having a higher frequency range than the first component. In such an embodiment, the first and second components 212, 214 need not be further separated into constituent components and may, instead, be fed directly to the analysis device 400. In other embodiments, it may be desirable to further separate one or more sensed components. In such embodiments, as described above, a processing apparatus (300 in FIG. 1) may be employed to separate one or more components into constituent components.

In the embodiment of FIG. 5, a system 802 also having a first displacement sensor 200 and second displacement sensor 220 is employed, but here the second displacement sensor 220 is oriented substantially along the X-axis of the reciprocating element. As described above, in the embodiment of FIG. 5, the first component 212 and second component 214 need not be further separated and is instead fed directly to the analysis device 400. In other embodiments, either or both components may be further separated into constituent components using a processing apparatus.

Figure 6:
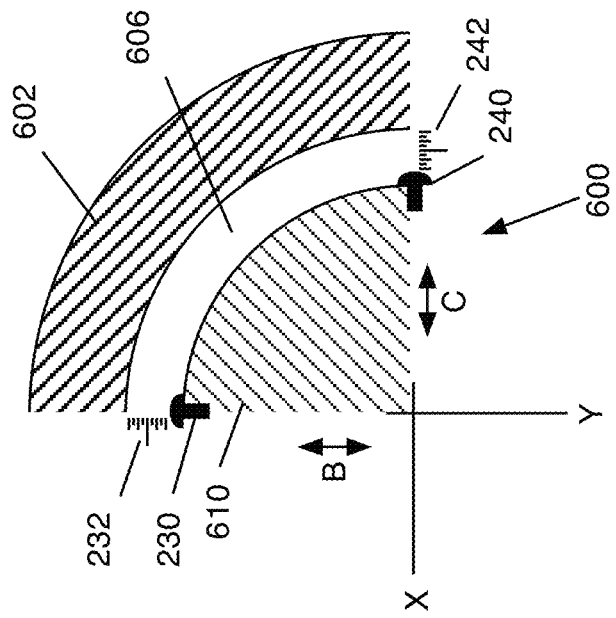
FIGS. 6-7 show detailed cross-sectional views of a reciprocating device in conjunction with various components of systems according to embodiments of the invention.

In FIG. 6, a detailed view of an embodiment of the invention similar to the embodiments of FIGS. 3 and 5 is shown. A first displacement sensor 230 and second displacement sensor 240 are integrated into a non-reciprocating element 602 of the reciprocating device 600. The first displacement sensor 230 senses a vibration signal produced by changes in the distance 232 between the reciprocating element 610 along the Y-axis (i.e., along path B) while the second displacement sensor 240 senses a vibration signal produced by changes in the distance 242 between the reciprocating element 610 along the X-axis (i.e., along path C). That is, each displacement sensor 230, 240 measures a change in the clearance 606 between the reciprocating element 610 and the non-reciprocating element 602 caused by anomalous or aberrant movement of the reciprocating element 610.

Figure 7:
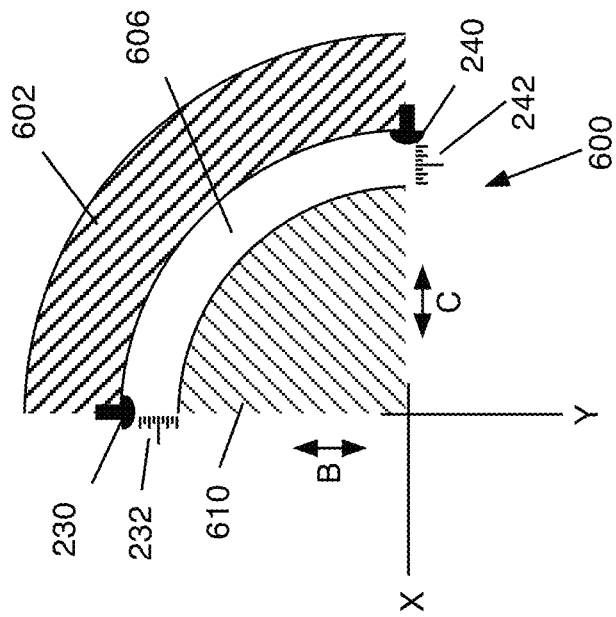

In the embodiment of FIG. 7, the displacement sensors 230, 240 are integrated into the reciprocating element 610 rather than the non-reciprocating element 602. As in the embodiment of FIG. 6, each displacement sensor 230, 240 measures a change in the clearance 606 between the reciprocating element 610 and the non-reciprocating element 602 caused by anomalous or aberrant movement of the reciprocating element 610.

Figure 8:
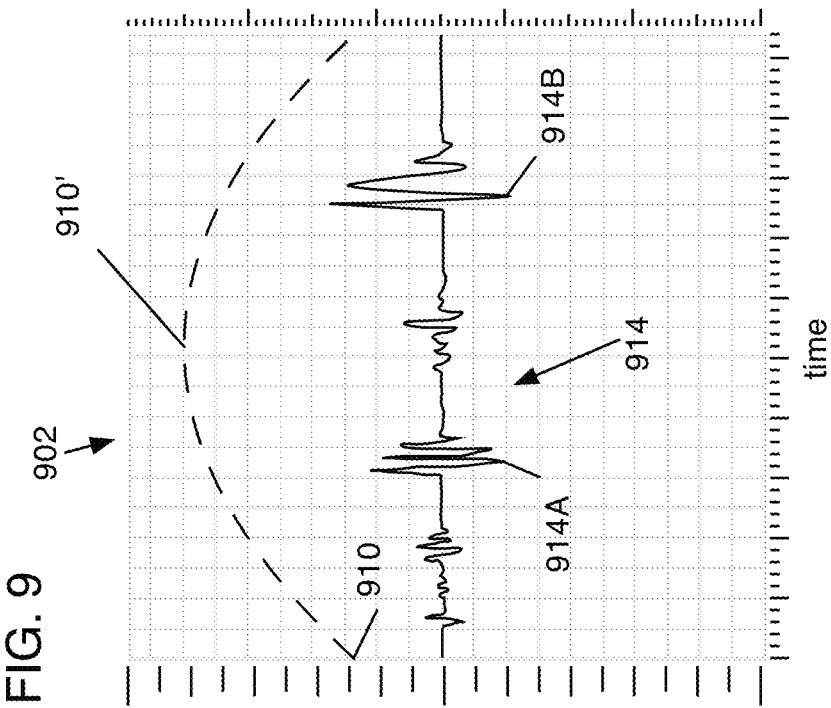
FIGS. 8-9 show graphical representations of an illustrative analysis of different components of a vibration signal produced by a reciprocating element.
Figure 9:
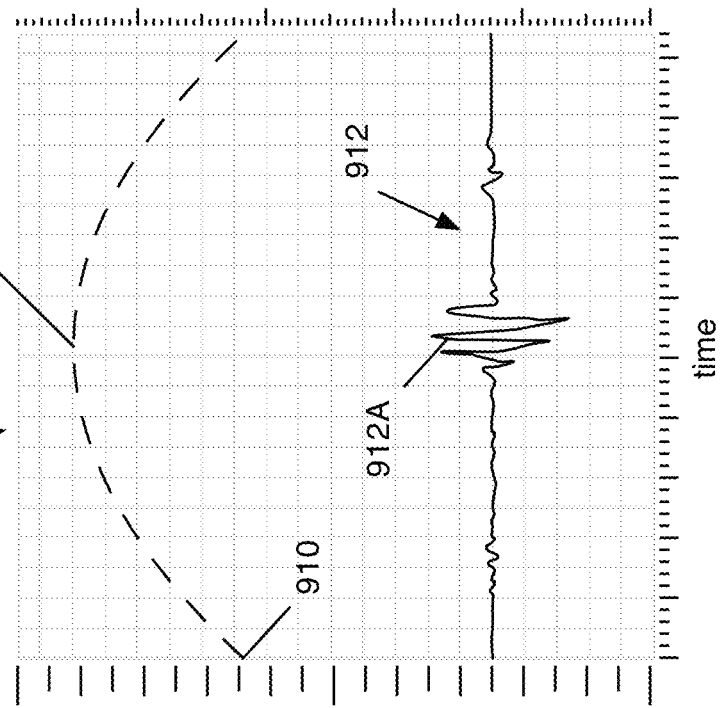

Referring now to FIGS. 8 and 9, graphical representations 900, 902, respectively, are shown, as might be used in analyzing components of the vibration signal. In FIG. 8, the graphical representation 900 shows the displacement of the reciprocating element between its proximal 910 and distal 910' positions and a "low-pass" component 912 of the vibration signal. As can be seen, the low-pass component 912 exhibits increased amplitude 912A as the reciprocating element reaches its distal position 910' (i.e., as the reciprocating element is fully extended by the rod (112 in FIG. 1)). It is possible that the increased amplitude 912A is expected at this point of the path of the reciprocating element. It may also be possible, of course, that the increased amplitude 912A is indicative of anomalous or aberrant movement of the reciprocating element, which may portend decreased efficiency or even impending failure of the reciprocating device.

In FIG. 9, the graphical representation 902 shows a "high-pass" component 914 exhibiting two areas of increased amplitude 914A, 914B, each at approximately the same point between the proximal 910 and distal 910' positions of the reciprocating element. The areas of increased amplitude 914A, 914B may indicate, for example, an obstruction or defect along the path of the reciprocating element, which the reciprocating element encounters during both the proximal-to-distal stroke and the return distal-to-proximal stroke.

Comparing the low-pass 912 and high-pass 914 components of FIGS. 8 and 9, it can be seen that the separate analyses of these components affords much greater diagnostic potential than would analysis of an unseparated vibration signal. If the low-pass component 912 and high-pass component 914 were to be overlaid, for example, the resulting signal may appear to exhibit three periodic increases in amplitude. By separating the vibration signal into components having different frequency ranges, or by separately sensing such components, it is possible, as shown in FIGS. 8 and 9, to better detect and diagnose anomalous or aberrant movement of the reciprocating element.

Figure 10:
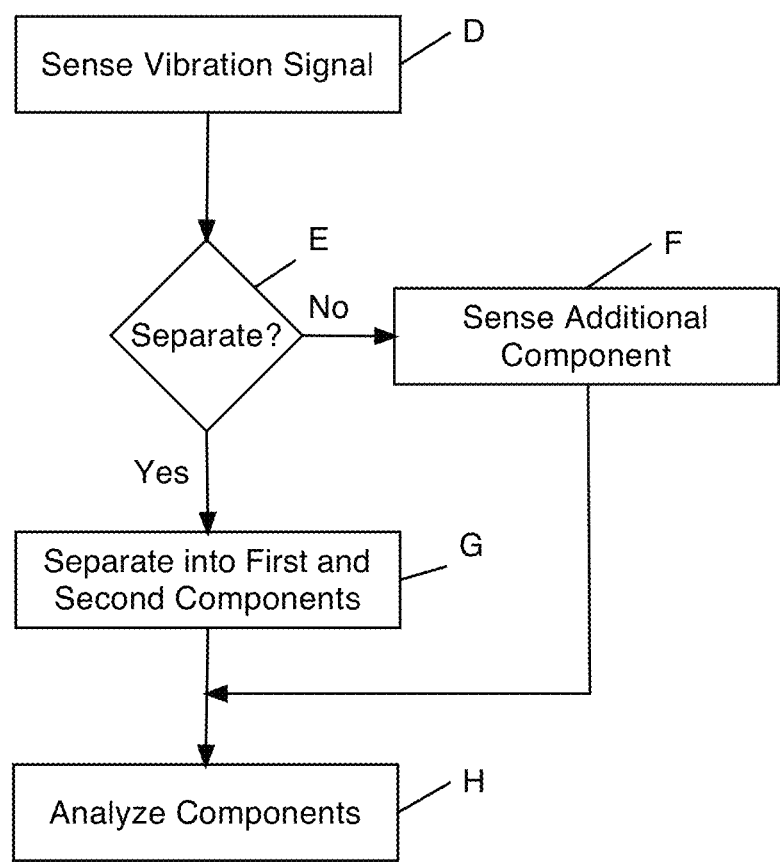
FIG. 10 shows a flow diagram of a method according to an embodiment of the invention.

FIG. 10 shows a flow diagram of an illustrative method according to the invention. At D, a vibration signal is sensed. As described above, this may include sensing the vibration signal as a whole or a component thereof. At E, it is determined whether the vibration signal sensed at D is to be separated into two or more components. If not (i.e., "No" at E), as may be the case where a component of the vibration signal was sensed at D, an additional component is sensed at F. It should be noted that, in such a case, both components may, and often would, be sensed simultaneously.

If the vibration signal is to be separated (i.e., "Yes" at E), the signal is separated into first and second components at G. As noted above, the vibration signal sensed at D may be separated into more than two components, the use of only two components here being for the sake of simplicity. In some embodiments of the invention, the frequency ranges of the first and second components are substantially non-overlapping. Finally, at H, the components are analyzed. Such analysis occurs irrespective of whether a "raw" vibration signal was sensed and subsequently separated into the components to be analyzed or the components themselves were separately sensed.

Analysis may, in some cases, include comparing the sensed vibration signal and/or its component(s), or data reflecting some manipulation thereof, to one or more reference signals or patterns of movement. Similarly, analysis may include storing some form of the vibration signal and/or its component(s), or data reflecting some manipulation thereof, for comparison to vibration signals and/or components sensed at another time.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for identifying an anomalous movement of a reciprocating element in a reciprocating device, the system comprising:
    at least one sensing device for sensing a vibration signal of the reciprocating element;
    a processing apparatus for separating the vibration signal into a first component having a first frequency range and a second component having a second frequency range different than the first frequency range; and
    a device for at least one of analyzing or displaying at least one of the first or the second components of the vibration signal, wherein the vibration signal includes positional data of the reciprocating element along at least one axis of the reciprocating element.

2. The system of claim 1, wherein the first frequency range is lower than the second frequency range.

3. The system of claim 1, wherein the first frequency range and the second frequency range are substantially non-overlapping.

4. The system of claim 1, wherein the device for at least one of analyzing or displaying is selected from a group consisting of:
    a printing device, an electronic display, and a computing device having at least one of hardware or software for analyzing the vibration signal.

5. The system of claim 1, wherein the processing apparatus is capable of separating the vibration signal into at least three components.

6. The system of claim 5, wherein each of the at least three components has a frequency range different than the other of the at least three components.

7. The system of claim 6, wherein the at least three frequency ranges are substantially non-overlapping.

8. The system of claim 1, wherein the reciprocating device is selected from a group consisting of:
    an engine, a pump, and a compressor.

9. A system for identifying an anomalous movement of a reciprocating element in a reciprocating device, the system comprising:
    a first sensing device for sensing a first component of a vibration signal of the reciprocating element, the first component having a first frequency range;
    a second sensing device for sensing a second component of the vibration signal of the reciprocating element, the second component having a second frequency range different than the first frequency range; and
    a device for at least one of analyzing or displaying at least one of the first and the second components of the vibration signal, wherein the vibration signal includes positional data of the reciprocating element along at least one axis of the reciprocating element.

10. The system of claim 9, wherein the first frequency range is lower than the second frequency range.

11. The system of claim 9, wherein the first frequency range and the second frequency range are substantially non-overlapping.

12. The system of claim 9, wherein the device for at least one of analyzing or displaying is selected from a group consisting of:
   a printing device, an electronic display, and a computing device having at least one of hardware or software for analyzing the vibration signal.

13. The system of claim 9, wherein the reciprocating device is selected from a group consisting of:
   an engine, a pump, and a compressor.

14. A reciprocating device comprising:
   a reciprocating element;
   at least one non-reciprocating element through which the reciprocating element passes; and
   at least one sensing device for sensing a vibration signal of the reciprocating element, wherein at least a portion of the at least one sensing device is located within the at least one non-reciprocating element and the vibration signal includes positional data of the reciprocating element along at least one axis of the reciprocating element.

\* \* \* \* \*